J. G. ZIMMERMAN.
POTENTIAL STARTER.
APPLICATION FILED NOV. 28, 1913.
1,200,687.
Patented Oct. 10, 1916.
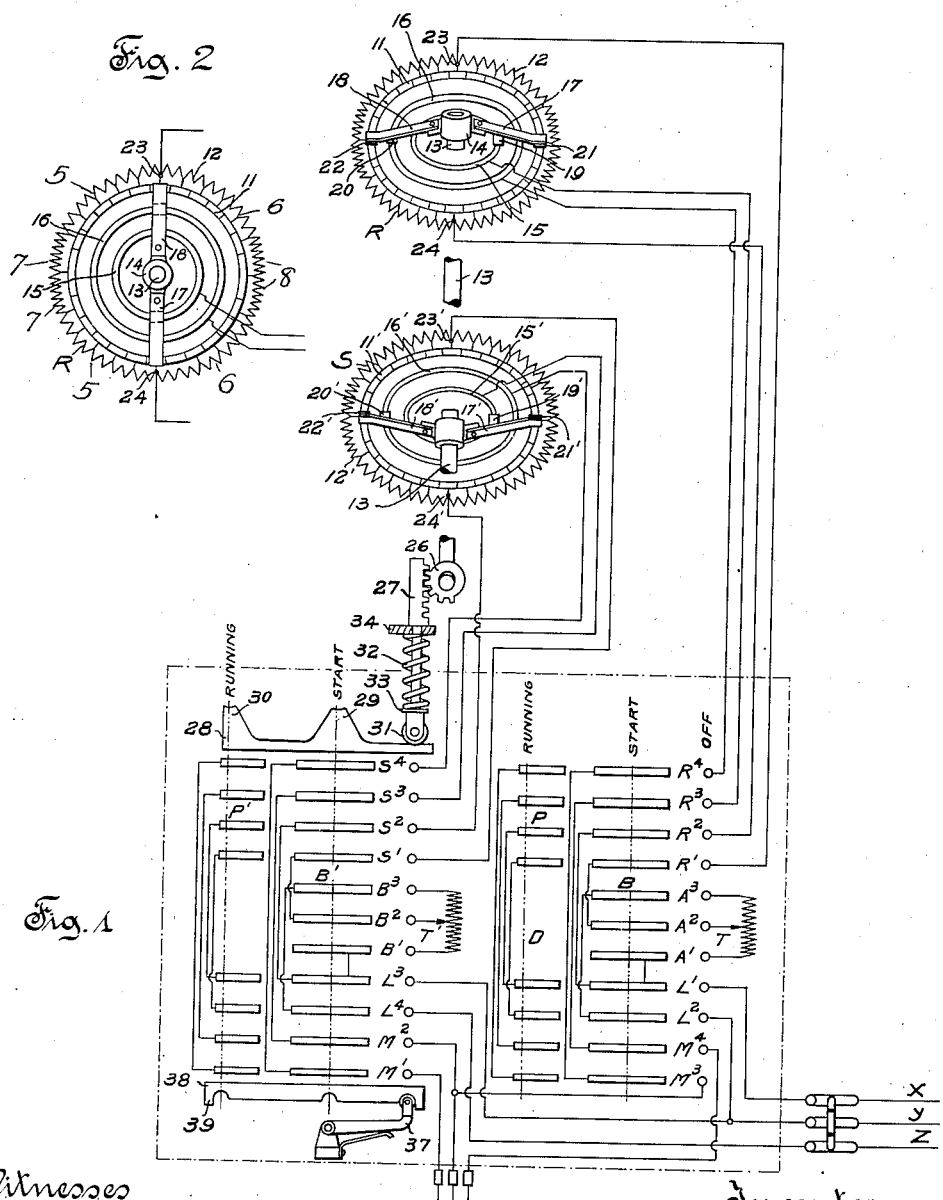

UNITED STATES PATENT OFFICE.

JAMES G. ZIMMERMAN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

POTENTIAL STARTER.

1,200,687.

Specification of Letters Patent. Patented Oct. 10, 1916.

Application filed November 28, 1913. Serial No. 804,107.

*To all whom it may concern:*

Be it known that I, JAMES G. ZIMMERMAN, a citizen of the United States, residing at Milwaukee, in the county of Milwaukee and State of Wisconsin, have invented a certain new and useful Improvement in Potential Starters, of which the following is a specification.

The present invention relates in general to a controlling apparatus for electric circuits, and has particular relation to such apparatus as is used for varying the power of such circuits.

In systems where it is desirable to vary the current, and means are provided for the purpose of regulating and controlling such systems, it is preferable that the current should increase and decrease gradually and, in no case, be subject to any violent fluctuation. Where controllers, of either the resistance or transformer type, are used, there is liable to be considerable undesirable fluctuation in the current value, especially when the current is actually broken between the successive steps of the regulating device.

In starting electric motors, it is usual to apply power to the motor in steps, to the end that the voltage across the terminals will be comparatively low when the motor is at rest or running at the lower speeds in order to save the machine from heavy currents in the windings due to the presence of comparatively little or no counter electromotive force. Voltage regulating means, of either resistance or transformer type, are provided to regulate the voltage at the motor terminals. In moving from one step to another in regulating the voltage, the circuit of the motor may be momentarily broken, necessitating, at times, arcing at the controller terminals, or may be changed without breaking the same; and, in either case, causing a sudden rush of current from one value to another, whether it be from zero to a positive value or from one positive value to another. These sudden increases in current value may be injurious to a decided degree, especially so where the current is actually broken in moving from step to step. In any case, it is desirable to have the current change from one value to another gradually.

In the ordinary potential starter, such as is used for starting induction motors, each time the motor circuit connections are changed during the starting operation in moving to the various transformer secondary taps, there is a considerable rush of current. If the circuit is actually broken between adjacent transformer secondary taps, this current change will be from zero to a maximum value which depends on the speed or counter electro-motive force of the secondary of the motor at the time the change occurs. This great rush of current has undesirable effects, among which may be mentioned, undue heating of the motor parts before the secondary speed can rise sufficiently to cut down the current, and the production of dangerously high induced electro-motive forces at the instant the circuit is opened or closed, and, further, it does not vary evenly but fluctuates irregularly as each increment of voltage is added. Such defects in the starting of induction motors may be overcome by an apparatus constructed in accordance with this invention.

The object of this invention is to provide means in combination with a controller for electric circuits which will, in a novel manner, obviate the undesirable effects resultant upon the abrupt change in the current flowing in the circuit.

It is a further object of this invention to provide, in combination with a device for starting a motor step by step, means which will prevent the actual breaking of the motor circuit at any time after the starting device is first operated, and which will insure that the current in the motor circuit varies gradually as the starting device is operated to the successive steps.

The various novel features of the invention will appear from the description and drawings disclosing one embodiment of such invention, and will be particularly pointed out in the claims.

In the drawings: Figure 1 is a diagrammatic view of a motor controlling apparatus of improved type constructed in accordance with this invention. Fig. 2 is a face view of a resistance element forming a part of the controlling apparatus shown in Fig. 1.

In the embodiment of this invention illustrated in the accompanying drawings, an alternating current distribution circuit X—Y—Z supplies a three-phase motor M, shown as of the induction type. A controlling apparatus embodying the principles of this invention, is inserted in the supply line to vary the potential applied to the motor terminals. The controlling apparatus comprises a potential starter D, of the ordinary three-phase type used for starting induction motors, and the resistance elements R and S, operatively connected to the starter D. This starter is of the type provided with but two transformers, each of which is connected to a separate phase of the supply circuit, a third phase for supplying the motor being obtained from a circuit comprising the two transformers connected in series.

In the potential starter D, contacts $L^1$, $L^2$, $L^3$, and $L^4$ are connected to the terminals of the three-phase supply circuit X—Y—Z. Contacts $A^1$ and $A^3$ are connected to the terminals of the transformer T, and contact $A^2$ is connected to an intermediate tap on such transformer. Contacts $B^1$ and $B^3$ are connected to the terminals of the transformer $T^1$, and contact $B^2$ is connected to an intermediate tap on this transformer. Contacts $M^1$, $M^2$, $M^3$ and $M^4$ are connected to the terminals of the motor M. These contacts are in position to be engaged by bridging contacts mounted on a rotatable drum. In so far as above described, the controller is the same as an ordinary three-phase potential starter.

Resistance elements, R and S, preferably of the rheostat type and comprising, as a body portion an insulating disk, are each provided with a peripheral row of contact segments 11 and $11^1$, respectively, connected to points on a continuous resistance 12 and $12^1$, respectively. A shaft 13 passing through the center of each rheostat carries insulating hubs 14 and $14^1$, secured so as to rotate with said shaft. Mounted on each disk within the rows of contact segments 11 and $11^1$, are circular contacts 15 and 16 and $15^1$ and $16^1$, respectively, insulatedly separated from each other and concentrically arranged about the shaft 13. Each hub is provided with two arms of conducting material 17, 18 and $17^1$, $18^1$, respectively, the arms 17 and 18 carrying contact brushes 19 and 20, respectively, and the arms $17^1$ and $18^1$ carrying contact brushes $19^1$ and $20^1$, respectively. These contact brushes are adapted to engage with the circular contacts 15, 16 and $15^1$, $16^1$, and remain in engagement therewith as the hub to which the contact arms are attached is rotated. The arms 17 and 18 are provided with additional contact brushes 21 and 22, respectively, to engage with the contact rings 15 and 16, respectively; and the arms $17^1$ and $18^1$ are provided with additional contact brushes $21^1$ and $22^1$, respectively to engage with the contact rings $15^1$ and $16^1$, respectively.

As will be obvious from the above descriptions, the two resistance elements R and S are similar in construction, corresponding parts on one rheostat, S, being designated by characters similar to those used on the other rheostat, R, but supplied with a prime. In one of the most convenient embodiments of this invention, the two rheostats R and S are mounted back to back so that the contacts of one rheostat R, are on the upper face thereof, and the contacts of the rheostat S are on the lower face thereof. It will be apparent that with this disposition of parts, the corresponding contact arms 17, $17^1$, and 18, $18^1$ will move in the same angular direction at the same time.

Terminals 23 and 24 are connected to points on the resistance 12, 180 degrees apart, and are also connected to the contact terminals $R^1$ and $R^2$, respectively, of the potential starter D. In a similar manner, the contact terminals $23^1$ and $24^1$, positioned 180 degrees apart on the resistance $12^1$, are connected to terminals $S^1$ and $S^2$, respectively, of the potential starter D.

Terminals $R^1$ and $R^2$ are connected, in one position of the controller D, which may be considered as being of the drum type, with points on the transformer T which will give half the voltage across the line terminals; and the terminals $S^1$ and $S^2$ are connected with points on the transformer $T^1$ which will give a similar voltage. Terminals $R^3$ and $R^4$ are connected with the contact rings 15 and 16, respectively; and terminals $S^3$ and $S^4$ are connected with the terminals $M^2$ and $M^1$, respectively. Hence, it is apparent that, in the starting position, the controller connects the motor to the supply circuit through the transformers T and $T^1$ and the resistances R and S, respectively.

When the controller drum is in a second position, bridging contacts on the drum connect the motor M to the supply circuit, through the resistances R and S, alone, the transformers T and $T^1$ being out of circuit.

Means are provided for automatically operating the rheostats R and S at the proper times by the movement of the controller drum. The shaft 13 is provided with a mutilated pinion 26 which meshes with a rack 27; and a cam 28 having projections 29 and 30 is mounted on the controller drum in position to be engaged by a roller 31 mounted on an extension of the rack 27. The roller is held in engagement with the cam 28 by a spring 32, positioned between the collar 33, secured to the rack extension, and the fixed abutment 34. As the drum is operated, the projections 29 and 30 engage the roller 31 to operate the shaft 13 and move the contact arms 17 and 18 and $17^1$ and $18^1$ over the contact segments 11 and $11^1$, respectively. The projections 29 and 30 are so disposed relatively to the bridging contacts on the drum that they operate the shaft subsequent to the first engagement of the bridging contacts with the fixed controller terminals, and prior to the disengagement of such bridging contacts from these controller terminals.

A spring-pressed detent 37 is adapted to engage in recesses in the member 38, secured to the controller drum, and releasably hold the drum in its various operative positions is held in this position by engagement of this roller in a recess in the end of such projection or by the engagement of the detent 37 with a recess in the member 38. The motor having reached a speed corresponding to the first step of the transformer secondary, it is now desirable to apply a higher voltage or full line voltage to the motor windings, and it is undesirable to break the circuit of suitable manner, whether it be by reverse rotation or rotation of the drum in the same direction.

It will be obvious that, with the controlling apparatus described, the circuit will not be broken when there is any difference of potential between the terminals of the motor windings, and that, whenever the circuits are changed, the current and voltage of the motor circuits are changed gradually.

The resistance elements 11 and $11^1$ may each be made up of sections of resistance of equal values or certain sections, 7 and 8, may be of higher resistance than corresponding sections located at other parts of the rheostats, as at 5 and 6, as shown in Fig. 2. With such an arrangement as is disclosed in this figure, the first part of the angular movement of the rheostat arms from a horizontal position cuts out more resistance and correspondingly increases the potential across the motor circuits to a greater degree than an angular movement of said arms of like extent, when the arms are moving over the sections 5 and 6.

The rheostatic element of the apparatus may be used whenever it is desirable to regulate the current or voltage of a circuit in such a manner as will preclude the possibility of sparking and will insure the change from one current value to another in a gradual manner.

While this invention has been described as being embodied in a potential starter, it will be obvious that resistance sections might be used instead of the transformer sections and that direct current might be used for alternating current.

It should be understood that it is not desired to be limited to the exact details of construction shown and described, for obvious modifications will occur to a person skilled in the art.

It is claimed and desired to be secured by Letters Patent:

1. In combination with a supply circuit, a consumption circuit, controlling means for varying the power supplied to said consumption circuit, and a regulating device for varying the power in said consumption circuit between zero and the maximum value for each position of said controlling means without interrupting said consumption circuit.

2. In combination with a supply circuit, a consumption circuit, controlling means for varying the power supplied to said consumption circuit, and a regulating device for causing the power in said consumption circuit to vary from zero to a predetermined maximum value when said controlling means is moved from one operative position to another to permit said maximum value of power to be supplied to said consumption circuit.

3. In combination with a supply circuit, a consumption circuit, controlling means for varying the power supplied to said consumption circuit, and a regulating device for causing the power in said consumption circuit to vary from zero to a predetermined maximum value subsequent to the operation of said controlling means to a position permitting such maximum power to flow and for causing it to vary from such maximum value to zero prior to the operation of the controller to another position.

4. In combination, a supply circuit, a consumption circuit, means for varying the potential permitted to be applied to said consumption circuit, and regulating means for gradually varying the potential applied to said consumption circuit between zero and said values permitted to be applied and for synchronously varying the current in said consumption circuit, said regulating means being operated by said potential varying means while said latter means is in its various operative positions.

5. In combination, a supply-circuit, a consumption circuit, means for varying the potential permitted to be applied to said consumption circuit, and means for varying the current supplied to said consumption circuit and for varying the potential applied to said consumption circuit between zero and predetermined maximum values permitted by said first means, said second means insuring that the potential of said consumption circuit shall be zero while said first potential varying means is being operated from one position to another.

6. In combination, a supply circuit, a consumption circuit, a controller having fixed and movable parts, a second controlling means electrically connected with said first controller and adapted to vary the resistance of said consumption circuit, said second controlling means having a movable contact portion, cam means on the movable part of said first controller, and an operative connection between said cam means and the movable contact portion of said second controlling means for removing resistance from said consumption circuit when said first controller is moved to each of its operative positions.

7. In combination, a polyphase supply circuit, a polyphase consumption circuit, a controller of the potential transformer type for varying the potential at the terminals of said consumption circuit, a second means for varying the voltage at the terminals of said consumption circuit between zero and the maximum value permitted in any position of said controller, said second voltage varying means comprising resistance devices equal in number to the number of phase transformers of said controller, said resistance devices comprising fixed and movable parts, said movable parts being operatively connected to the movable part of said controller and acting in conjunction with said fixed parts to gradually increase and decrease the current in said consumption circuit while said controller is in each of its operative positions and to reduce the voltage of the consumption circuit prior to the change from one operative position to another of said controller.

8. In a controlling apparatus for electric motors, a controller for varying the voltage permitted to be applied to the motor terminals, said controller having a plurality of operative positions, and a regulating device insertible in circuit with the motor for varying the potential applied to the motor terminals between zero and predetermined values permitted to be applied in the operative positions of said controller without disconnecting the motor terminals from said controller.

9. In a controlling apparatus for electric motors, a controller for varying the potential permitted to be applied to said motor, said controller having a plurality of operative positions, and a regulating device operative by said controller to vary in a plurality of steps the potential applied to said motor between a maximum value permitted to be applied in one operative position of said controller and a reduced value and from said reduced value to a maximum value permitted to be applied in a second operative position of said controller when said controller is moved from said first operative position to said second operative position.

10. In combination, a motor, controlling means for said motor adapted in its different operative positions to produce different speeds in said motor, and regulating means automatically operated by said controlling means to reduce the voltage across the motor terminals prior to each speed increasing operation of said controlling means.

11. In combination, a motor, controlling means for said motor adapted in its different operative positions to produce different speeds in said motor, and regulating means automatically operated by said controlling means to reduce the voltage across the motor terminals prior to each speed increasing operation of said controlling means and to gradually increase the current flowing in said motor circuit subsequent to each speed increasing operation of said controlling means.

12. In combination, a supply circuit, a motor adapted to be fed from said supply circuit, a controller for varying the potential permitted to be applied to said motor circuit, and regulating means connected between said controller and said motor, said regulating means comprising resistance sections adapted to be included in the motor circuit and contact arms operatively engaging with said resistance sections and operatively connected to said controller and movable thereby, said regulating means being operated by said controller to remove resistance from and insert resistance in said motor circuit while said controller is in each of its potential varying positions.

13. In combination, a supply circuit, a motor adapted to be fed from said supply circuit, a controller for varying the potential permitted to be applied to said motor circuit, regulating means connected between said controller and said motor, said regulating means comprising resistance sections adapted to be included in the motor circuit and contact arms operatively connected to said controller and movable thereby to reduce the resistance of said motor circuit when said controller is operated to increase the power of said motor circuit, the contact arms of said regulating means being in position to include maximum resistance in said motor circuit and to reduce the voltage across the motor terminals prior to the operation of said controller from one operative position to another.

14. In combination, a supply circuit, a motor adapted to be fed from said supply circuit, a controller for varying the potential permitted to be applied to said motor circuit, regulating means connected between said controller and said motor, said regulating means comprising a pluralty of resistance sections providing parallel paths adapted to be included in the motor circuit, and contact arms operatively connected to said controller and movable thereby to reduce the resistance of said motor circuit by simultaneously reducing the resistance of said parallel paths by equal amounts when said controller is operated to increase the power of said motor circuit, said regulating means being operated by said controller to remove resistance from and insert resistance in said motor circuit while said controller is in each of its potential varying positions.

15. In combination, a supply circuit, a consumption circuit, controlling means for varying the power supplied to said consumption circuit in a plurality of steps, and regulating means operative to reduce the power of said consumption circuit below the maximum value permitted to be applied in one operative position of said controlling means prior to the operation of said controlling means from said operative position to another operative position.

16. In combination, a supply circuit, a consumption circuit, controlling means for varying the potential applied to said consumption circuit, and regulating means operative by said controlling means to vary the potential applied to said consumption circuit from zero to maximum value permitted to be applied in one operative position of said controlling means and from said maximum value to zero while said controlling means is in such operative position.

17. In combination with a supply circuit, a consumption circuit, controlling means for varying the power supplied to said consumption circuit in a plurality of steps, and a regulating device for gradually varying the power in said consumption circuit between zero and the maximum value for each operative position of said controlling means when said controlling means is operated to the corresponding position.

Milwaukee, Wis., Nov. 3, 1913.

In testimony whereof, the signature of the inventor is affixed hereto in the presence of two witnesses.

JAMES G. ZIMMERMAN.

Witnesses:
J. W. J. KANE,
W. H. LIEBER.